(12) United States Patent
Chen et al.

(10) Patent No.: US 12,195,565 B2
(45) Date of Patent: Jan. 14, 2025

(54) POLYMER AND METHODS FOR MANUFACTURING IT

(71) Applicant: KEMIRA OYJ, Helsinki (FI)

(72) Inventors: Xiaoyu Chen, Shanghai (CN); Xuan Li, Shanghai (CN)

(73) Assignee: Kemira Oyj, Helsinki (FI)

(*) Notice: Subject to any disclaimer, the term of this patent is extended or adjusted under 35 U.S.C. 154(b) by 761 days.

(21) Appl. No.: 17/417,469

(22) PCT Filed: Dec. 27, 2018

(86) PCT No.: PCT/CN2018/124208
§ 371 (c)(1),
(2) Date: Jun. 23, 2021

(87) PCT Pub. No.: WO2020/133034
PCT Pub. Date: Jul. 2, 2020

(65) Prior Publication Data
US 2022/0073660 A1    Mar. 10, 2022

(51) Int. Cl.
| | | |
|---|---|---|
| C08F 212/08 | (2006.01) | |
| C08F 2/22 | (2006.01) | |
| C08F 8/42 | (2006.01) | |
| C08F 220/18 | (2006.01) | |
| C08F 230/08 | (2006.01) | |
| C08F 292/00 | (2006.01) | |
| C08L 3/02 | (2006.01) | |

(52) U.S. Cl.
CPC ............. *C08F 212/08* (2013.01); *C08F 2/22* (2013.01); *C08F 8/42* (2013.01); *C08F 220/1804* (2020.02); *C08F 230/085* (2020.02); *C08L 3/02* (2013.01)

(58) Field of Classification Search
CPC .... C08F 212/08; C08F 2/22; C08F 220/1804; C08F 230/085; C08F 292/00
See application file for complete search history.

(56) References Cited

U.S. PATENT DOCUMENTS

2005/0227077 A1    10/2005   Sugiyama
2008/0146743 A1    6/2008    Minge et al.

FOREIGN PATENT DOCUMENTS

| CN | 101302730 | | 11/2008 |
| CN | 101948561 | | 1/2011 |
| CN | 102604003 | | 7/2012 |
| CN | 106283869 | | 1/2017 |
| CN | 106758527 | A | 5/2017 |
| CN | 106906663 | A | 6/2017 |
| JP | 2007070772 | A | 3/2007 |
| WO | 2018011182 | A1 | 1/2018 |

OTHER PUBLICATIONS

International Search Report and Written Opinion dated Oct. 8, 2019, from International Application No. PCT/CN2018/124208, 7 pages.
Supplementary European Search Report for corresponding European patent application EP18944462 dated on Jun. 8, 2022; 2 pages.
Li, X. et al., "Effects of Silica Sol on Structure and Properties of Core-Shell Silicon-Acrylic Materials", Advances in Chemical Engineering and Science, 2, pp. 192-198.
Zou, H. et al., "Polymer/Silica Nanocomposites: Preparation, Characterization, Properties, and Applications", Chemical Reviews, 108, pp. 3893-3957.
Office action of the corresponding Canadian application CA3121643, dated Dec. 19, 2023. 5p.

*Primary Examiner* — Catherine S Branch
(74) *Attorney, Agent, or Firm* — Meunier Carlin & Curfman LLC

(57) ABSTRACT

The invention relates to a polymer having a main chain which is obtained by free radical emulsion polymerisation of a monomer mixture, which comprises at least one optionally substituted styrene, at least one C1-C4 alkyl (meth)acrylate and at least one ethylenically unsaturated monomer. The monomer mixture is polymerised in a reaction mixture comprising a natural and/or synthetic polymeric stabilizer. According to the invention the polymer main chain further comprises a reaction product of silica sol and an unsaturated organosilicon compound. The invention relates also to methods of making such polymer.

20 Claims, No Drawings

POLYMER AND METHODS FOR MANUFACTURING IT

This is a U.S. national stage application of the international application number PCT/CN2018/124208 filed on Dec. 27, 2018, the contents of which are incorporated herein by reference.

The present invention relates to a polymer and to methods of manufacturing it according to the preambles of the enclosed independent claims.

Paper and board are surface sized for example in order to increase the hydrophobicity and/or other barrier properties of the paper/board surface. In general surface sizing improves water resistance, printability and surface strength of the paper or board. It may also make the paper or board more suitable for, for example, food packaging, e.g. by increasing its resistance to grease. Surface sizing may also improve the storage properties of the paper or board in humid environments. Especially in warm countries with humid climate there is a constant problem that paper and board absorb moisture from air during the storage. This moisture absorption may, in extreme cases, spoil the paper/board during the storage and make it unsuitable for the planned use. In any case there is a risk for reduced paper or board quality and possible problems in the processes using the stored paper/board, as strength, printing properties, etc. of the paper or board may be reduced due to the absorbed moisture.

Surface sizing is usually performed by using aqueous sizing compositions that contain starch or synthetic acrylic co-polymers. However, there is a constant need for new alternative compounds that can be used for surface sizing and that are able to provide improved properties for the paper or board. At the same time the compounds should be easily repulpable, easy and safe to use.

An object of this invention is to minimise or even eliminate the disadvantages existing in the prior art.

An object is also to provide a polymer dispersion that provides good barrier properties at least against water absorption, especially against absorption of atmospheric moisture, as well as good strength properties for paper and board.

A further object of this invention is to provide a polymer dispersion that is easy to use and is suitable for repulping.

Another object of this invention is to provide methods for manufacturing polymers that are suitable for surface sizing.

These objects are attained with the invention having the characteristics presented below in the characterising part of the independent claim. Some preferable embodiments are disclosed in the dependent claims.

The embodiments mentioned in this text relate, where applicable, to all aspects of the invention, even if this is not always separately mentioned.

Typical polymer according to the present invention has a main chain which is obtained by free radical emulsion polymerisation of a monomer mixture, which comprises
  at least one optionally substituted styrene,
  at least one C1-C4 alkyl (meth)acrylate,
  at least one ethylenically unsaturated monomer, and
polymerised in a reaction mixture comprising a natural and/or synthetic polymeric stabilizer,
wherein the polymer main chain further comprises a reaction product of silica sol and an unsaturated organosilicon compound.

Typical method for manufacturing a polymer according to the invention comprises
  a) allowing silica sol and an unsaturated organosilicon compound to react with each other and to form a reaction product,
  b) polymerizing by free radical emulsion polymerization in a solution of a natural and/or synthetic polymeric stabilizer a mixture comprising
    at least one optionally substituted styrene,
    at least one C1-C4 alkyl (meth)acrylate,
    at least one ethylenically unsaturated monomer, and
    the reaction product obtained in step a).

Another typical method for manufacturing a polymer according to the invention comprises
  a) polymerizing by free radical emulsion polymerization in a solution of a natural and/or synthetic polymeric stabilizer a mixture comprising
    at least one optionally substituted styrene,
    at least one C1-C4 alkyl (meth)acrylate,
    at least one ethylenically unsaturated monomer, and
    at least one unsaturated organosilicon compound,
  b) allowing the intermediate dispersion produced in step a) to react with silica sol.

Now it has been surprisingly found out that a polymer where the main chain comprises a reaction product of an unsaturated organosilicon compound and silica sol provides unexpected advantages in surface sizing. The polymer provides good barrier properties against moisture, especially atmospheric moisture, thus improving the storage properties of the sized paper and board in humid conditions. Furthermore, the polymer provides good strength properties, wear resistance and/or thermal stability for paper and board when the polymer is used for surface sizing of paper and board. It is assumed, without wishing to be bound by any theory, that the introduction of an organosilicon compound to the main chain of the styrene acrylate polymer and its reaction with silica sol changes the conventional linear styrene acrylate structure into a three-dimensional network through chemical interactions with the organic and inorganic compounds. This changed structure provides the polymer with properties which are especially suitable for surface sizing applications.

In the present context the term "main chain" denotes the longest series of covalently bonded styrene monomers, alkyl (meth)acrylate monomers, ethylenically unsaturated monomers, and unsaturated organosilicon compounds. These bonded monomers create together a continuous chain, which forms the main chain of the polymer. All other groups are considered pendant from the main chain. For example, the silica sol which is reacted with the organosilicon compound forms a pendant group to the main chain.

According to the invention the polymer main chain comprises an unsaturated organosilicon compound, which has been reacted with silica sol. This means that the organosilicon compound is polymerised together with the styrene monomers, acrylate monomers and ethylenically unsaturated monomers. The organosilicon compound thus forms an integral and inseparable part of the polymer main chain. The reaction with silica sol is performed before or after polymerisation. According to one embodiment of the invention the main chain may comprise 0.3-6 weight-%, preferably 0.5-5 weight-%, of the unsaturated organosilicon compound.

According to one embodiment of the invention the unsaturated organosilicon compound is an alkenyl siloxane. Preferably the alkenyl siloxane may be selected from vinyl siloxane or 3-trimethoxysilylpropylmethacrylate.

Silica sols which are suitable for use in the present invention are aqueous dispersion, which may have solids content in the range of 20-40 weight-%, preferably 25-35 weight-%. Silica sol may have an average particle size in the range of 25-50 nm, preferably 30-45 nm, more preferably 35-43 nm. pH of the silica sol may be less than 3.5, preferably pH is in the range of 2-3. Viscosity of the silica sol may be in the range of 2.0-10.0 cP, preferably 3.0-5.5 cP, more preferably 4-5 cP, sometimes around 4.5 cP.

Silica sol reacts with the organosilicon compound and is permanently bound with it. Thus, the polymer according to the invention comprises pendant side groups, attached to the main chain, the side groups originating from silica sol.

According to one embodiment of the invention the organosilicon compound is first allowed to react with silica sol, i.e. before the free radical emulsion polymerisation with the other monomers, and to form a reaction product. According to one embodiment the reaction product may be obtained by reacting an alkenyl siloxane and tetraethoxysilane. In this case the reaction product of silica sol and an unsaturated organosilicon compound is added to the mixture of styrene, acrylate and ethylenically unsaturated monomers, and the mixture is then polymerised in order to form the desired polymer. Silica sol and the unsaturated organosilicon compound may be reacted with each other as an aqueous mixture, preferably in a temperature range of 50-70° C., more preferably 55-65° C. According to one embodiment silica sol and the unsaturated organosilicon compound are reacted with each other in pH range of 3.5-5.5, preferably 4-5.

According to an alternative embodiment the organosilicon compound is first added to the mixture of styrene, acrylate and ethylenically unsaturated monomers, and the mixture is polymerised in order to form an intermediate dispersion. This intermediate dispersion is then reacted with silica sol, wherein silica sol assumedly reacts with the part of the main chain which originates from the organosilicon compound. The intermediate dispersion and silica sol may be reacted with each other in a temperature range of 65-95° C., preferably 70-90° C., and/or in a pH range of 3.5-5.5, preferably 4-5.

According to one embodiment of the invention the ratio intermediate dispersion:silica sol may be 25:1-3:1, preferably 18:1-5:1, calculated from total dry monomers and silica sol.

The polymer according to the present invention is obtained by polymerising monomer mixture, which comprises at least one optionally substituted styrene. According to one preferable embodiment the styrene monomer may be selected from a group comprising styrene, substituted styrenes, such as α-methylstyrene, vinyltoluene, ethylvinyltoluene, chloromethylstyrene, and any mixtures thereof. Typically, the amount of styrene monomer in the monomer mixture may be 5-60 weight-%, preferably 10-55 weight-%, more preferably 10-40 weight-%, even more preferably 20-35 weight-%, calculated from the total dry monomer content in the monomer mixture.

The monomer mixture for the polymer according to the present invention further comprises at least one C1-C4 alkyl (meth)acrylate. According to one preferable embodiment of the present invention the C1-C4 alkyl (meth)acrylate monomer may be selected from group consisting of C1-C4-alkyl acrylates; C1-C4-alkyl methacrylates; or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. According to another preferable embodiment the C1-C4 alkyl (meth)acrylate monomers are selected from butyl (meth)acrylates. They can comprise, for example, a mixture of at least two isomeric butyl acrylates. More preferably, the C1-C4 alkyl (meth)acrylate monomer is n-butyl acrylate, tert-butyl acrylate or a mixture of n-butyl acrylate and tert-butyl acrylate. The amount of C1-C4 alkyl (meth)acrylate monomer in the monomer mixture may be 5-25 weight-%, preferably 10-20 weight-%, more preferably 12-18 weight-%, calculated from the total dry monomer content in the monomer mixture.

The monomer mixture for the polymer according to the present invention further comprises at least one ethylenically unsaturated monomer. The at least one ethylenically unsaturated monomer may be selected from a group consisting of ethylhexyl acrylate, stearyl acrylate, stearyl methacrylate, esters of acrylic and methacrylic acid with alcohols which have more than four C atoms, and further acrylonitrile, methacrylonitrile, acrylamide, vinyl acetate or carboxylic acids, such as acrylic acid, methacrylic acid, itaconic acid, maleic acid or styrene sulphonic acid, or any mixtures thereof. According to one embodiment the at least one ethylenically unsaturated monomer may be acrylic acid or styrene sulphonic acid or their mixture. The amount of the ethylenically unsaturated monomer may be 5-35 weight-%, preferably 10-30 weight-% preferably 15-25 weight-%, calculated from the total dry monomer content in the monomer mixture.

The monomers forming the polymer according to the present invention are polymerised in the presence of a natural or synthetic polymeric stabilizer. The polymeric stabilizer may be a natural polymer, such as degraded starch or dextrin, or a synthetic polymer, such as polyvinyl alcohol. The concentration of the polymeric stabilizer in the monomer mixture may be 4-15 weight-%, preferably 6-12 weight-%, calculated from the total weight of the polymer dispersion.

According to one embodiment the natural polymeric stabilizer may be polysaccharide stabilizer, which may be starch or which may be selected from any polysaccharide, which contains a free hydroxyl group, such as amylose, amylopectin, carrageen, cellulose, chitosan, chitin, dextrines, guar gum (guarane) and other galactomannans, arabic gum, hemicellulose components, and pullulan. Preferably the natural polymeric stabilizer is starch, even more preferably degraded starch. According to one preferable embodiment the polymeric stabilizer is degraded starch having average molecular weight Mn from 500 to 10 000 Da. Degraded starch may be obtained by subjecting starch to oxidative, thermal, acidic, hydrolytic or enzymatic degradation. Degraded starch, which is suitable for used in the present invention as polymeric stabilizer, may be any suitable degraded natural starch, such as potato, waxy potato, rice, corn, waxy corn, wheat, barley or tapioca starch. Starches having an amylopectin content >80%, preferably >95%, are advantageous.

According to another embodiment the polymeric stabilizer is a synthetic polymeric stabilizer, preferably polyvinyl alcohol. The synthetic polymeric stabilizer may have a weight average molecular weight <40 000 g/mol, preferably <30 000 g/mol. The average molecular weight may be, for example, in the range of 10 000-40 000 g/mol, preferably 15 000-30 000 g/mol. In case the polymeric stabilizer is polyvinyl alcohol, it may have a hydrolysis degree greater than 80%.

According to one embodiment of the invention the monomer mixture used for manufacturing the polymer comprises 10-40 weight-%, preferably 20-35 weight-%, of at least one optionally substituted styrene; 10-20 weight-%, preferably 12-18 weight-%, of at least one C1-C4 alkyl (meth)acrylate;

and 10-30 weight-% preferably 15-25 weight-%, of at least one ethylenically unsaturated monomer.

The polymer that is obtained by free radical emulsion polymerisation is in form of an aqueous polymer dispersion. According to one preferable embodiment the polymer is in form of a dispersion, comprising polymer particles having a D (50) value <110 nm, preferably <100 nm, more preferably <80 nm, and/or a D (90) value <200 nm, preferably <170 nm, more preferably <150 nm.

According to one embodiment the polymer is in form of a dispersion, where the solids content of the dispersion is >25 weight-%, more typically >30%, based on the weight of the total dispersion.

The polymer according to the present invention is especially suitable for surface sizing of paper, board or the like.

EXPERIMENTAL

Preparation of the Polymer
  Polymer used in the experiments was prepared as follows:
  82.98 g starch and an amount of water were added into a reactor under stirring, heated up to 80° C., and kept in this temperature for 30 min. After this 0.53 g ferrous sulphate and 15.89 g silica sol were added, and the reaction mixture was heated up to 85° C. A mixture comprising 99.57 g styrene, 49.79 g butyl acrylate, 49.79 g tert-butyl acrylate and 5.30 g 3-trimethoxysilyl-propyl-methacrylate was formed and added to the reaction mixture simultaneously with a mixture of 25.25 g hydrogen peroxide and water. The addition was completed in 4 hours. After the addition was completed the reaction mixture was kept at 85° C. under stirring for 1 h, whereafter it was cooled down to room temperature.
  The total amount of water in the reaction mixture was 670.89 g.
Preparation of Surface Size Solution Comprising a Polymer
  80 g oxidatively degraded tapioca starch and 920 g water were added into a glass beaker under stirring and heated up to 95° C. When the temperature reached 95° C., the starch mixture was kept in this temperature 30 min, and then cooled down to 70° C. For obtaining the used surface size solution, 6.0 g of the polymer solution prepared above was added into warm (70° C.) starch solution, under effective stirring.
Sizing Experiments
  Sizing experiments were generally performed as follows:
  200 g of a surface size solution was weighed and poured it in the middle of two rolls of size press. The size press was opened, the rollers started to rotate, a paper was put in the middle of the two rollers, so that the surface size solution evenly coated the surface of the paper. Pick-up was 2.2 g/m² (two sides). The paper was removed and dried by using a heating plate. The sized paper was liner paper, weight 180 g/m².
  Three surface size solutions were prepared:
  Ref 1 (reference): surface size solution comprising a commercial
  Ref 2 (reference): starch solution comprising 7.1% of starch LS-2
  Solution 1: surface size solution comprising polymer according to the invention, prepared as described above.
  The results of the sizing experiments are shown in Tables 1 and 2.

TABLE 1

Cobb120 (g/m²) results obtained in sizing experiments.

| | Size dosage, kg/t | | |
|---|---|---|---|
| | 0.5 | 1 | 1.5 |
| Ref 1 | 45 | 39 | 26 |
| Solution 1 | 67.6 | 39 | 31 |

Cobb120 values describe the water absorbance of the paper. The higher the value, the more water the paper absorbs. It is seen from Table 1 that the surface size solution comprising the polymer according to the invention provides weaker resistance for water absorption at lower size dosage than a commercial reference. At higher dosages the results are similar with the results obtained with a commercial reference.

TABLE 2

Ring Crush (Nm/g) results obtained in sizing experiments.

| | Ring crush (Nm/g) | | | | | |
|---|---|---|---|---|---|---|
| Dosage | Ref 2 | | Ref 1 | | Solution 1 | |
| (kg/t) | L-CRT | T-CRT | L-CRT | T-CRT | L-CRT | T-CRT |
| 2 | 9.0 | 7.0 | 8.93 | 7.86 | 10.36 | 8.14 |
| 4 | | | 10.36 | 8.14 | 10.21 | 8.0 |
| 6 | | | 10.5 | 7.5 | 10.5 | 7.71 |

L-CRT = Longitudinal ring crush strength
T-CRT = Transverse ring crush strength

Ring crush test gives a measure of the edgewise compression of paper. In the test a short cylinder is inserted into an annular groove and axially loaded to failure. It is seen from the results in Table 2 that the surface size solution comprising the polymer according to the invention provides better results as starch alone, and as good or better results than the commercial reference. Especially at low dosage the results show unexpected improvement.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A polymer having a main chain and being obtained by free radical emulsion polymerization of a monomer mixture comprising:
  10-40 weight-% of at least one optionally substituted styrene;
  10-20 weight-% of at least one C1-C4 alkyl (meth) acrylate; and
  10-30 weight-% of at least one ethylenically unsaturated monomer;
  wherein the polymerization is conducted in a reaction mixture comprising a natural and/or synthetic polymeric stabilizer, and
  wherein the main chain comprises a reaction product of silica sol and an unsaturated organosilicon compound.

2. The polymer according to claim 1, wherein the monomer mixture further comprises the reaction product of silica sol and an unsaturated organosilicon compound.

3. The polymer according to claim 1, wherein the polymer is obtained by
a) polymerizing by free radical emulsion polymerization the monomer mixture comprising:
at least one optionally substituted styrene,
at least one C1-C4 alkyl (meth)acrylate,
at least one ethylenically unsaturated monomer, and
at least one unsaturated organosilicon compound,
in the reaction mixture comprising a natural and/or synthetic polymeric stabilizer for obtaining an intermediate, and
b) reacting the intermediate obtained in step a) with silica sol.

4. The polymer according to claim 1, wherein the unsaturated organosilicon compound is an alkenyl siloxane.

5. The polymer according to claim 4, wherein the alkenyl siloxane is selected from vinyl siloxane or 3-trimethoxysilylpropylmethacrylate.

6. The polymer according to claim 1, wherein the reaction product is obtained by reacting an alkenyl siloxane and tetraethoxysilane.

7. The polymer according to claim 1, wherein the main chain comprises 0.3-6 weight, of the unsaturated organosilicon compound.

8. The polymer according to claim 1, wherein the monomer mixture comprises
20-35 weight-%, of at least one optionally substituted styrene,
12-18 weight-%, of at least one C1-C4 alkyl (meth)acrylate, and
15-25 weight-%, of at least one ethylenically unsaturated monomer.

9. The polymer according to claim 1, wherein the ethylenically unsaturated monomer is selected from the group consisting of ethylhexyl acrylate, stearyl acrylate, stearyl methacrylate, esters of acrylic and methacrylic acid with alcohols having more than four C atoms, acrylonitrile, methacrylonitrile, acrylamide, vinyl acetate, and anionic comonomers.

10. The polymer according claim 1, wherein the natural polymeric stabilizer is a polysaccharide stabilizer.

11. The polymer according to claim 1, wherein the synthetic polymeric stabilizer is polyvinyl alcohol.

12. The polymer according to claim 1, wherein the polymer is in form of a dispersion, where the polymer particles have D (50) value<110 nm and/or D (90) value<200 nm.

13. The polymer according to claim 12, wherein the solids content of the polymer dispersion is >25 weight-% based on the weight of the total dispersion.

14. A method to prepare a dispersion of the polymer of claim 1, comprising:
a) allowing silica sol and an unsaturated organosilicon compound to react with each other and to form a reaction product,
b) polymerizing by free radical emulsion polymerization in a solution of a natural and/or synthetic polymeric stabilizer a mixture comprising:
at least one optionally substituted styrene,
at least one C1-C4 alkyl (meth)acrylate,
at least one ethylenically unsaturated monomer, and
the reaction product obtained in step a).

15. The method according to claim 14, wherein the silica sol and the unsaturated organosilicon compound are reacted with each other in a temperature range of 50-70° C.

16. The method according to claim 14, wherein the silica sol and the unsaturated organosilicon compound are reacted with each other in pH in the range of 3.5-5.5.

17. A method to prepare the polymer according to claim 1, comprising:
a) producing an intermediate dispersion by polymerizing by free radical emulsion polymerization in a solution of a natural and/or synthetic polymeric stabilizer a mixture comprising:
at least one optionally substituted styrene,
at least one C1-C4 alkyl (meth)acrylate,
at least one ethylenically unsaturated monomer, and
at least one unsaturated organosilicon compound, and
b) allowing the intermediate dispersion produced in step a) to react with silica sol.

18. The method according to claim 17, wherein the intermediate dispersion and silica sol are reacted with each other in a temperature range of 65-95° C.

19. The method according to claim 17, wherein the intermediate dispersion and silica sol are reacted with each other in pH in the range of 3.5-5.5.

20. The method according to claim 17, wherein the ratio intermediate dispersion:silica sol is 25:1-3:1 calculated from total dry monomers and silica sol.

* * * * *